Aug. 29, 1939. W. R. BAXTER Re. 21,182

HIGHWAY GUARDRAIL CONSTRUCTION

Original Filed Jan. 16, 1933

INVENTOR.

William R. Baxter

BY

Fray, Obelin & Fray

ATTORNEYS.

Reissued Aug. 29, 1939 Re. 21,182

UNITED STATES PATENT OFFICE 21,182

HIGHWAY GUARDRAIL CONSTRUCTION

William R. Baxter, Garfield Heights, Ohio, assignor to The Empire Plow Company, Cleveland, Ohio, a corporation of Ohio Original No. 2,078,704, dated April 27, 1937, Serial No. 651,971, January 16, 1933. Application for reissue August 24, 1938, Serial No. 226,598

40 Claims. (Cl. 256—13.1)

Highway guard rails when struck by an automobile at high speed are called upon to withstand an enormous load. Heretofore it has been customary to apply coil springs or open expanding springs between the posts and the rail. I have found, however, that a compression coil spring tends to excessively localize the energy on the individual post, and an open expanding type of spring opposes progressively less resistance instead of a maintained or increased resistance. In accordance with my invention, a construction may now be had which particularly facilitates dissipation of shock along the system, and protects the individual post by well sustained resistance. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

Figure 1:
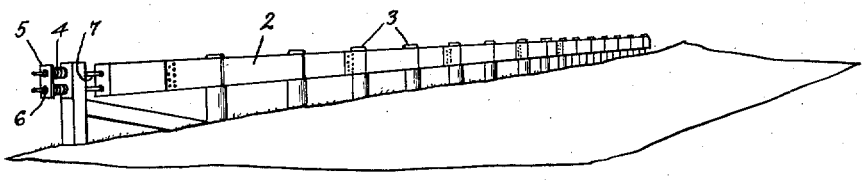
Figure 2:
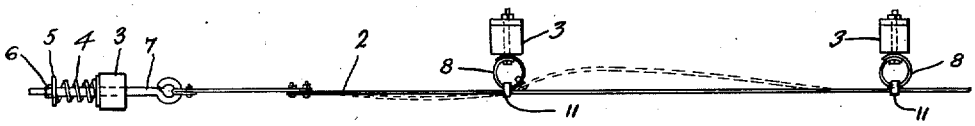
Figure 4:
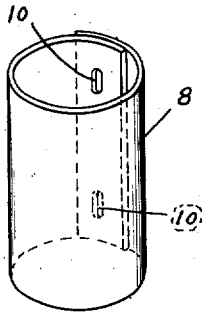
Figure 3:
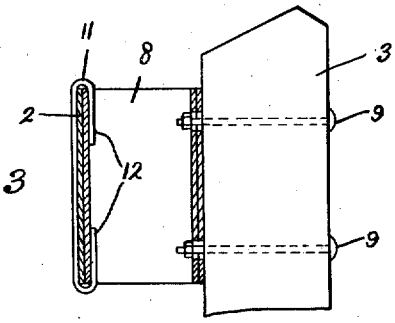
Figure 5:
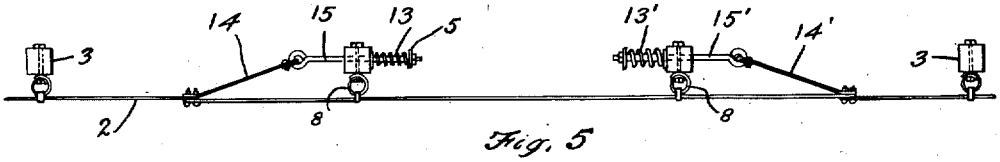
Figure 6:
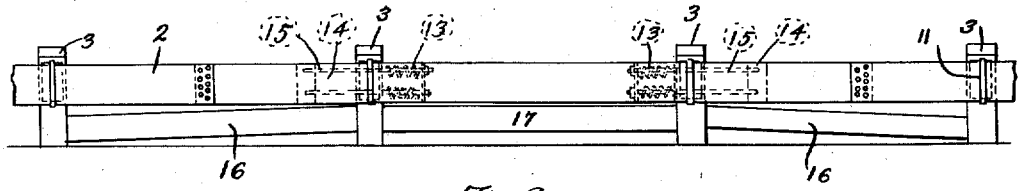
Figure 7:
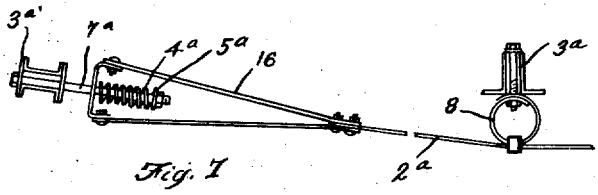

In said annexed drawing:

Fig. 1 is a perspective view of a portion of a guard rail construction in accordance with the invention; Fig. 2 is a fragmentary plan view; Fig. 3 is an enlarged vertical sectional detail; Fig. 4 is an enlarged perspective view of a detail; Fig. 5 is a plan view showing further constructional features; Fig. 6 is a front elevational view of the same; and Fig. 7 is a fragmentary plan view of a modification.

Referring more particularly to the drawing there is shown a longitudinal or guard rail member on suitable support means, which may be posts, or in some cases bridge-elements already existent, as requirements dictate in particular installations and illustrated for instance as posts 3. The guard rail member may be any suitable strong material, as bar, cable, wire mesh, plate, etc., as may be preferred in any given situation, some being more effective than others. It preferably has some resiliency in itself, and in a desirable form may be a sheet metal or plate metal member extending longitudinally and in front of the supporting means. Resilient end take-up anchorages are provided, for instance as springs 4 interposed between the anchor post and a retaining yoke 5 against which nuts 6 are adjustably engaged on the screw-threaded ends of the stem 7. Only one such end take-up anchorage is shown, but it will be understood that such end take-up anchorage may be provided at either or at both ends of the rail. Interposed between the supporting means or posts 3 and the guard rail member 2 are resilient closed ring members 8 of more or less circular section, and whatever the section form, preferably having outwardly convex rounded front faces, these being held to the posts or supports, while the rail 2 is connected in such manner as to allow longitudinal play. As illustrated in enlarged showings in Figs. 3 and 4, such resilient closed ring members may take the form of a sheet metal closed band 8 held to the post 3 by bolts 9. The closed band-members 8 are of resilient spring sheet or plate stock, and may be maintained in their closed position by the bolts passing through aligned holes 10 in the over-lapping margins. Desirably the bolt holes 10 are elongated in vertical direction, so as to facilitate a measure of compensative adjustment in leveling up or installing. As a means for retaining the guard rail member 2 in connection with the resilient closed ring members 8, and in juxtaposition with the rounded front faces thereof, a clip means 11 allowing free relative slippage is provided. In the form shown in Fig. 3 this is a metal bar bent over at each end to form an engaging lug 12 which rides inside of the closed band member 8, and outside of the rail member 2 riding freely on both, with a result that the guard rail may slide longitudinally in front of the closed band member 8, and if deflected by impact out of its normal plane, by impact of a vehicle with the rail at a point between a pair of band members, being capable of sliding around the band members with the clip 11 through quite an arc on the circumference or rounded front face of the closed band member 8, as indicated in dotted line position in Fig. 2. In some such instances the clip may not so slide but in every such case the rail will slide and, as shown in Fig. 2, will bend around the rounded front face of the band member and be always tangential thereto, whereby, because of the extent of the curvature of the said front face (the form illustrated being substantially cylindrical), the rail will not be sharply bent or permanently deformed.

In some cases, particularly where a considerable stretch of ground has to be covered I may also introduce longitudinal tensioning spring means at a point or points between the ends. Such means may desirably take the form of a longitudinally compensative spring, such for instance as coil spring 13, which may be connected to the guard rail member 2 by suitable means, as an arm-extension 14 fastened to the guard rail member and connecting to the eye of a bolt 15 riding within the spring 13, the latter being positioned between the post 3 and a yoke 5 held by take-up nuts on the screw-threaded end of the bolt. It will be understood that the bolt members 15 are freely slidable through appropriate holes in the post. Desirably, a companion spring-anchorage is located adjacent that just described, and directed oppositely, as for instance the spring-member 13' on the bolt-member 15' which likewise is connected to an arm-extension 14' secured to the guard rail member 2. Bracing members 16, 17 are advantageously positioned between the adjacent posts at such point.

The manner of operation of my guard rail construction will be readily apparent. Normally the guard rail member is maintained in aligned position alongside a highway, and in the event of impact by an automobile, yields at such point more or less, depending upon the angle and force of impact of the blow, yielding being permitted by the resilient character of the construction and the mounting. Since the guard rail member is longitudinally movable, the stress of impact is distributed along the system and progressively damped out, instead of being concentrated wholly at the point of impact. The manner of engagement between the supporting means and the guard rail member makes possible in particular a graduated yielding action, the guard rail not only being allowed to slide past the closed-band members, but the latter also contributing in movement longitudinally and transversely. A ramified shock-absorber system of stress-distribution is thus had, which minimizes damage to both automobile and guard rail establishment.

It will be observed that the intermediate longitudinal tensioning means, comprising the spring 13 or the springs 13 and 13' and their anchorage is located wholly behind and therefore protected or covered by the rail, and leaves the front of the rail unobstructed.

Instead of arranging the end take-up or longitudinal-tensioning means comprising the springs 4 in more or less open exposure, in some instances, I prefer a protected arrangement. As indicated in Fig. 7, this may comprise in conjunction with the series of supporting means or posts 3a, and the longitudinal guard rail member 2a, a longitudinal-tensioning means such as springs 4a on stems 7a carried by supports or posts 3a', a projecting housing member 16 being provided at the back and secured to the rail member 2a, enclosing and completing a bearing means for the springs as confined also by the yoke 5a. A convenient form for the housing may involve a suitably heavy sheet metal stirrup-like enclosure extending from the end of the rail 2a and perforated for the stems or bolts 7a. With the springs 4a between the stirrup and the yoke 5a, any slight adjustment desired may be had by the nuts on the ends of the stems 7a against the yoke. Resilient means for connecting the rail member to the support means 3a may be incorporated, and preferably will be in the form of resilient closed ring members 8 as above described.

It will, of course, be realized that the housing 16 shown in Fig. 7, and the spring assembly shown in this figure, may be used in the constructions illustrated in Figs. 1, 2, 5, and 6 as I have previously stated and that my improved guard rail construction may be used interchangeably with either wooden posts 3 or metallic supports 3a. This construction has many important advantages, the most outstanding of which is the location of a spring between an end post and an adjacent post of the series of posts. Obviously, the spring does not project outwardly in an unprotected manner, and adjustment of the spring is easily obtained by turning the bolt head on the stem 7a. Additional protective means are provided in the form of the housing 16 so that the spring is doubly guarded and in the event of impact at this point no projecting bolts will strike the impacting vehicle. Thus it will be seen that I have provided a tensioned guard rail in which the tensioning means cannot seriously damage a vehicle upon impact therewith, or injure the vehicle or occupants thereof upon impact therewith.

The several longitudinal tensioning means described above may be constructed and adjusted to provide the desired amount of tension in the rail, and I prefer by this means to provide such tension that upon impact of a vehicle with the rail at a point between a pair of the members 8, the longitudinal tensioning means will resiliently yield and permit the rail to slide and be bent or deflected inwardly and be bent or wrapped around the rounded front face of the adjacent member or members 8, as illustrated in Fig. 2, to prevent or reduce permanent deformation of the rail, as described above.

Other modes of applying the principle of the invention may be employed, change being made as regards the details described, provided the means stated in any of the following claims, or the equivalent of such be employed.

I therefore particularly point out and distinctly claim as my invention:

1. A guard rail construction, comprising a series of resilient closed ring members, supporting means therefor, and a rail extending from closed ring member to closed ring member movable independently thereof.

2. A guard rail construction, comprising a series of resilient closed ring members, supporting means therefor, and a longitudinally slidable rail backed and supported by said closed ring members.

3. A guard rail construction, comprising guard rail supporting means and a longitudinally slidable guard rail having end spring anchorage, and a longitudinally tensioning spring at a point between ends.

4. A guard rail construction, comprising rail supporting means and a longitudinally slidable sheet metal guard rail having end spring anchorage, an arm extension from said rail at a point between ends, and a spring anchorage therefor.

5. A guard rail construction, comprising a longitudinal rail means, supporting means, resilient closed ring members between said rail means and said supporting means, a spring for longitudinally tensioning said rail means, and means for protecting said spring.

6. A guard rail construction, comprising supporting means, a series of resilient closed band-members mounted along said supporting means, a sheet metal rail member extending along in front of said closed band-members and a metal clip bar having each end bent over and into an end of each closed band-member and enclosing the rail member.

7. A guard rail construction, comprising guard rail supporting means and a longitudinally slidable guard rail having end spring anchorage, an arm-extension from said rail at a point between ends, a spring anchorage therefor, another arm-extension from said rail near said first-named arm-extension, and a spring anchorage for said second-mentioned arm-extension.

8. A guard rail construction, comprising a series of resilient closed ring-members, supporting means therefor, a longitudinally independently movable rail supported in front of said resilient closed ring-members, and a longitudinal tensioning end spring for said guard rail.

9. A guard rail construction, comprising a longitudinal sheet metal rail, resilient closed ring members backing said rail and clips embracing said ring members and rail for permitting longitudinal movement, a spring for longitudinally tensioning the rail, and a sheet metal housing about said spring and forming a connection to the rail.

10. A guard rail construction, comprising a series of resilient closed ring-members, supporting means therefor, a longitudinally movable rail supported in front of said resilient closed ring-members, a longitudinal tensioning end spring for said guard rail, and a longitudinal tensioning spring at a point between ends.

11. A guard rail construction, comprising a series of resilient closed ring-members, supporting means therefor, a longitudinally movable rail supported in front of said resilient closed ring-members, a longitudinal tensioning end spring for said guard rail, an arm-extension from said rail at a point between ends, and a spring anchorage therefor.

12. A guard rail construction, comprising a series of resilient closed ring-members, supporting means therefor, a longitudinally movable rail supported in front of said resilient closed ring-members, a longitudinal tensioning end spring for said guard rail, adjacent arm-extensions from the said rail at a point between ends, and oppositely directed spring anchorages for said arm-extensions.

13. A guard rail construction, comprising supporting means, a series of resilient closed band-members mounted along said supporting means, a sheet metal guard rail member extending along in front of said closed band members, a metal clip bar having each end bent over and into an end of each closed band member and enclosing the rail member, and end spring anchorage for said rail member.

14. A guard rail construction, comprising supporting means, a series of resilient closed band members mounted along said supporting means, a sheet metal guard rail member extending along in front of said closed band members, a metal clip bar having each end bent over and into an end of each closed band member and enclosing the rail member, end spring anchorage for said rail member, and a longitudinally tensioning spring at a point between ends.

15. A guard rail construction, comprising supporting means, a series of resilient closed band members mounted along said supporting means, a sheet metal guard rail member extending along and in front of said closed band members, a metal clip bar having each end bent over and into an end of each closed band member and enclosing the rail member, end spring anchorage for said rail member, a pair of adjacent arm-extensions from said rail at a point between ends, and oppositely directed spring anchorages for said arm-extensions.

16. A guard rail construction comprising a series of posts, a series of ring members attached to said posts, and a rail extending from ring member to ring member, and means slidably embracing said ring member and said rail to support said rail.

17. A guard rail construction comprising a series of posts, a series of ring members attached to said posts, and a rail extending from ring member to ring member, and means slidably embracing said ring member to support said rail.

18. A guard rail construction comprising a series of posts, a series of ring members attached to said posts, and a rail extending from ring member to ring member, and means embracing said ring member and slidably embracing said rail to support said rail.

19. A guard rail construction comprising supporting means, a longitudinal sheet metal rail, closed ring members backing said rail and clips embracing said ring members and rail for permitting longitudinal movement of said rail with respect to said supporting means and a spring longitudinally tensioning said rail.

20. A guard rail construction, comprising a series of supporting posts, a longitudinal sheet metal rail, ring means supporting said rail with respect to said posts, and a spring longitudinally tensioning said rail, said spring being located between an end post of said series of posts and an adjacent post and means protecting said spring from direct impact.

21. A guard rail construction, comprising a series of supporting posts, rail supporting members, and a longitudinal sheet metal rail, said rail extending in front of said posts, means permitting movement of said rail with respect to said members comprising guide clips slidably embracing said rail and said members whereby arcuate movement of said clip is obtained under impact.

22. A guard rail construction comprising a series of supporting posts, rail supporting members on the posts each in the form of a sheet metal ring having a forwardly convex rounded face, a longitudinally extending sheet metal rail supported by the supporting members and against the said faces by means permitting longitudinal sliding movement of the rail, resilient means subjecting the rail to longitudinal tension and yieldable upon impact of a vehicle with the rail at a point between a pair of supporting members to permit the rail to be deflected inwardly and to slide upon the faces and to bend round the curvatures of said rounded faces, the said rounded faces being of sufficient extent and curving sufficiently gradually to substantially prevent localized bending and permanent deformation of the rail at its points of sliding contact therewith upon the occurrence of the maximum impact force and the maximum yielding of the rail.

23. A guard rail construction comprising a series of supporting posts, rail supporting members of upwardly and downwardly open band form on the posts having forwardly convex rounded faces, a longitudinally extending sheet metal rail supported by the supporting members and against the said faces by clip bars each having its opposite ends bent over and embracing the upper and lower edge portions of the supporting member and of the rail and permitting longitudinal sliding movement of the rail, resilient means subjecting the rail to longitudinal tension and yieldable upon impact of a vehicle with the rail at a point between a pair of supporting members to permit the rail to be deflected inwardly and to slide upon the faces and to bend round the curvatures of said rounded faces, the said rounded faces being of sufficient extent and curving sufficiently gradually to substantially prevent permanent deformation of the rail at its points of bending thereon upon the occurrence ofo the maximum impact force and the maximum yielding of the rail.

24. A guard rail construction comprising a resilient rail support in the form of a tubular spring having a rounded outwardly convex front wall, and a clip bar having its opposite ends bent to loosely embrace the upper and lower edges of the front wall and having its intermediate portion spaced from the front wall and a guard rail between the intermediate portion and the said front wall, and a post for supporting the support.

25. In a guard rail construction a resilient rail support in the form of a sheet metal tubular spring with edges of the metal at the back of the tube and having a rounded outwardly convex front wall, and a clip bar having its opposite ends bent to loosely embrace the upper and lower edges of the front wall and having its intermediate portions spaced from the front wall, a guard rail between the intermediate portion and the said front wall, and a post supporting the support.

26. A guard rail construction comprising a series of posts, a series of sheet metal springs mounted on the posts by means securing a portion of each spring to a post, the springs having each a substantially vertical front portion spaced from the post, a guard rail extending along and in engagement with the front portions of the springs, the springs being yieldable toward the posts upon impact of a vehicle with the rail at a point adjacent to the spring and the rail being connected directly to and the weight of the rail being carried by the springs through the agency of means allowing unlimited sliding movement of the rail relative to the springs and the springs being substantially unyieldable in vertical direction and thereby maintaining the said front portions substantially vertical while supporting the rail.

27. A guard rail construction comprising a series of posts, a series of resilient rail supports on the posts, a guard rail extending along the series of resilient supports, the resilient supports having rounded front faces in juxtaposition with the rail, the resilient rail supports being yieldable toward the posts upon the impact of a vehicle with the rail at a point adjacent to the support, resilient yieldable means subjecting the rail to longitudinal tension and the rail being connected to and carried directly by the resilient supports by means allowing unlimited sliding movement of the rail relative to the supports effected by deflection of the rail upon vehicle impact therewith at a point between a pair of resilient supports, and the rounded faces of the supports permitting the deflected rail to bend around the supports without permanent distortion of the rail thereat.

28. A guard rail construction comprising a series of posts, a series of resilient rail supports on the posts, a guard rail extending along the series of resilient supports, the resilient supports having rounded front faces in juxtaposition with the rail, the resilient rail supports being yieldable toward the posts upon the impact of a vehicle with the rail at a point adjacent to the support, resilient yieldable means subjecting the rail to longitudinal tension and the rail having free longitudinal movement relative to the posts upon deflection of the rail by vehicle impact therewith at a point between a pair of resilient supports and the rounded faces of the supports permitting the deflected rail to bend around the supports without permanent distortion of the rail thereat and permitting the resilient means to retract the deflected rail after the deflecting impact force has been removed.

29. A guard rail construction, comprising guard rail supporting means, and a longitudinally slidable guard rail having end spring anchorage, and a longitudinally tensioning spring at a point between ends and wholly behind the rail.

30. A guard rail construction, comprising guard rail supporting means and a longitudinally slidable sheet metal guard rail having end spring anchorage, an arm extension from said rail at a point between ends, and a spring anchorage therefor, the arm extension and the spring anchorage being wholly behind the rail.

31. A guard rail construction comprising guard rail supporting means, a guard rail supported to slide longitudinally of the supporting means, a plurality of resilient means and an anchorage for each disposed intermediately of the ends of the rail, each said intermediate resilient means tensioning a different portion of the whole rail, and the plurality of intermediate resilient means being disposed wholly behind the rail.

32. A guard rail construction comprising guard rail supporting means, a guard rail supported to slide longitudinally of the supporting means, the rail having resilient means at its opposite ends for tensioning the rail as a whole, a plurality of resilient means and an anchorage for each disposed intermediately of the ends of the rail, each said intermediate resilient means tensioning a portion of the whole rail, and the plurality of intermediate resilient means being disposed wholly behind the rail.

33. A guard rail construction comprising guard rail supporting means, a guard rail supported on the supporting means, a plurality of resilient means and an anchorage for each disposed intermediately of the ends of the rail, each said intermediate resilient means tensioning a different portion of the whole rail and the plurality of intermediate resilient means being disposed wholly behind the rail.

34. A guard rail construction comprising guard rail supporting means, a guard rail supported on the supporting means, the rail having resilient means at its opposite ends for tensioning the rail as a whole, a plurality of resilient means and an anchorage for each disposed intermediately of the ends of the rail, each said intermediate resilient means tensioning a portion of the whole rail and the plurality of intermediate resilient means being disposed wholly behind the rail.

35. A guard rail construction comprising guard rail supporting means, a longitudinally extending guard rail having spring means at the end for exerting longitudinal tension on the rail and spring means disposed at a point between the ends of the rail and wholly behind the rail and normally exerting resilient force on the rail on a line of spring action in the longitudinal direction of the rail for exerting longitudinal tension on a portion of the rail.

36. A guard rail construction comprising rail supporting means and a longitudinally extending sheet metal guard rail having an end spring and an anchorage therefor to longitudinally tension the rail, means extending from the back side of the rail at a point between its ends and comprising a second spring and an anchorage therefor to longitudinally tension the rail, said means and the second spring and anchorage being wholly behind the rail.

37. A guard rail construction comprising a resilient rail support in the form of a tubular spring having a rounded outwardly convex front wall, and a clip bar having its opposite ends bent to loosely embrace the upper and lower edges of the front wall and having its intermediate portion spaced from the wall to receive a guard rail between the intermediate portion and the said front wall and the spring provided with means by which it may be secured to a post.

38. In a guard rail construction a resilient rail support in the form of a sheet metal tubular spring with edges of the metal overlapping at the back of the tube and having a rounded outwardly convex front wall, and a clip bar having its opposite ends bent to loosely embrace the upper and lower edges of the front wall and having its intermediate portion spaced from the front wall to receive a guard rail between the intermediate portion and the said front wall and the support having means associated with the said overlapping edges for mounting the support on a post.

39. A guard rail construction comprising a series of posts, a series of resilient rail supports on the posts, each in the form of a sheet metal tube with the edges of the sheet metal at the back of the tube and having a forwardly convex unbroken unobstructed rounded face, a guard rail extending along the series of resilient supports in juxtaposition with the rounded faces, the resilient rail supports being yieldable toward the posts upon the impact of a vehicle with the rail at a point adjacent to the support, resilient yieldable means subjecting the rail to longitudinal tension and the rail being connected to and carried directly by the resilient supports by means allowing unlimited sliding movement of the rail relative to the supports effected by deflection of the rail upon vehicle impact therewith at a point between a pair of resilient supports and the rounded faces of the supports permitting the deflected rail to bend around the supports without permanent distortion of the rail thereat.

40. A road guard construction comprising a series of posts, a series of resilient sheet metal supports attached to said posts, the supports having each a forwardly convex surface, a guard rail extending from support to support and in juxtaposition with said surfaces and means mounting the rail upon the supports, permitting longitudinal sliding movement relative to the supports.

WILLIAM R. BAXTER.